United States Patent
Shin et al.

(10) Patent No.: US 8,738,984 B2
(45) Date of Patent: May 27, 2014

(54) APPARATUS FOR PROCESSING RETRANSMISSION FAILURE IN RADIO LINK CONTROL (RLC) LAYER

(75) Inventors: Jae Wook Shin, Daejeon (KR); Aesoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 224 days.

(21) Appl. No.: 12/895,112

(22) Filed: Sep. 30, 2010

(65) Prior Publication Data

US 2011/0154146 A1 Jun. 23, 2011

(30) Foreign Application Priority Data

Dec. 21, 2009 (KR) .................. 10-2009-0128001

(51) Int. Cl.
*H04L 1/18* (2006.01)
(52) U.S. Cl.
USPC ........................................ 714/749
(58) Field of Classification Search
USPC ........................................ 714/749
See application file for complete search history.

(56) References Cited

U.S. PATENT DOCUMENTS

| | | | |
|---|---|---|---|
| 6,470,391 B2* | 10/2002 | Takamoto et al. | 709/227 |
| 6,621,796 B1* | 9/2003 | Miklos | 370/236 |
| 2007/0037602 A1* | 2/2007 | Shimizu et al. | 455/550.1 |
| 2007/0280181 A1* | 12/2007 | Matsuo et al. | 370/338 |
| 2008/0222478 A1* | 9/2008 | Tamaki | 714/749 |
| 2010/0050040 A1* | 2/2010 | Samuels et al. | 714/749 |
| 2011/0222498 A1* | 9/2011 | Chun et al. | 370/329 |

FOREIGN PATENT DOCUMENTS

| | | |
|---|---|---|
| KR | 1020030012152 | 2/2003 |
| KR | 1020090083867 | 8/2009 |

* cited by examiner

*Primary Examiner* — Albert Decady
*Assistant Examiner* — Enam Ahmed
(74) *Attorney, Agent, or Firm* — Nelson Mullins Riley & Scarborough LLP; Anthony A. Laurentano, Esq.; Lewis Lee, Esq.

(57) ABSTRACT

Provided are a data transmission apparatus and a data reception apparatus when a retransmission of a data unit repeatedly fails in a Radio Link Control (RLC) layer. When a retransmission with respect to a particular data unit, for example, a Protocol Data Unit (PDU) continuously fails, each of a transmission entity and a reception entity may detect the retransmission failure and locally process a corresponding packet. Accordingly, the transmission entity and the reception entity may continuously transmit and receive data.

10 Claims, 8 Drawing Sheets

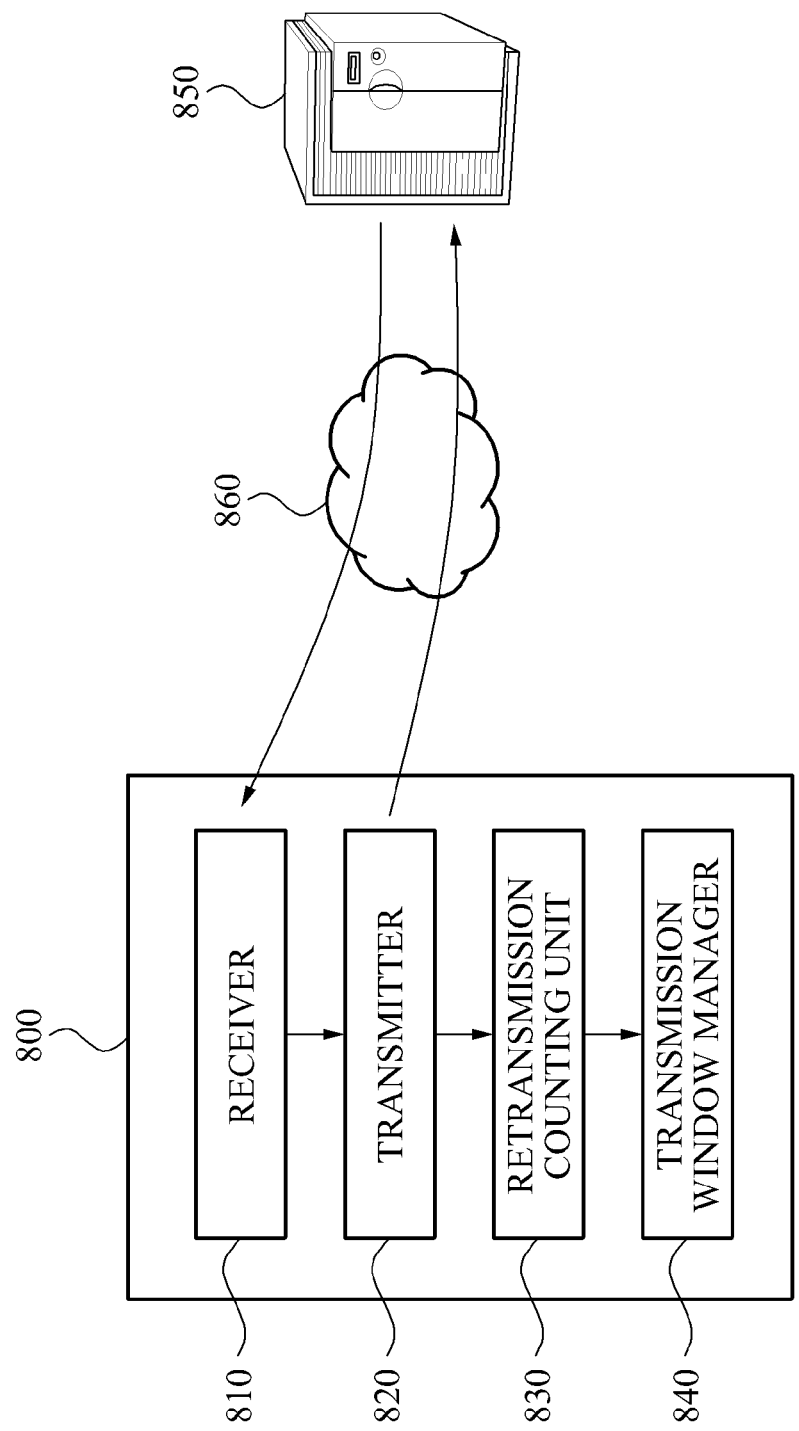

APPARATUS FOR PROCESSING RETRANSMISSION FAILURE IN RADIO LINK CONTROL (RLC) LAYER

CROSS-REFERENCE TO RELATED APPLICATION

This application claims the benefit of Korean Patent Application No. 10-2009-0128001, filed on Dec. 21, 2009, in the Korean Intellectual Property Office, the disclosure of which is incorporated herein by reference.

BACKGROUND

1. Field of the Invention

The present invention relates to a technology that enables a transmission entity and a reception entity to detect a retransmission failure and to locally process a corresponding packet when a retransmission with respect to a particular data unit, for example, a Protocol Data Unit (PDU) fails in a Radio Link Control (RLC) layer of a $3^{rd}$ Generation Partnership Project (3GPP) Long Term Evolution (LTE)-Advanced mobile communication system, and thereby enables the transmission entity and the reception entity to continuously transmit and receive additional data without falling into a deadlock state.

2. Description of the Related Art

In the case of a radio interface of a conventional $3^{rd}$ Generation Partnership Project (3GPP) mobile communication system, a reliable data transmission has been guaranteed using an Automatic Repeat Request (ARQ) retransmission function in a Radio Link Control (RLC) layer. However, as requirements for a system throughput increases, a retransmission in the RLC layer may have some drawbacks in an aspect of efficiency. To transmit data at even higher rates, a Hybrid-ARQ (HARQ) scheme that is a retransmission scheme in a Physical/Medium Access Control (PHY/MAC) layer has been applied.

The HARQ scheme may reduce retransmission overhead by performing a feedback and a retransmission based on a transmission error in a PHY layer. Generally, as a number of HARQ retransmissions increases, a frame transmission error rate may decrease. However, it may not indicate that all the transmission errors may be detected and be recovered by HARQ. Accordingly, an ARQ retransmission function of an upper RLC layer is still required to provide a relatively low frame transmission rate.

In an RLC ARQ retransmission scheme, a data transmission apparatus may transmit a data unit to a data reception apparatus. When the data reception apparatus fails in receiving the data unit, the data reception apparatus may transmit, to the data transmission apparatus, a transmission failure message, that is, a Not Acknowledge (NACK) with respect to the data unit.

The data transmission apparatus may retransmit the data unit for which the transmission failure message is reported, and thereby recover from a transmission error. However, when a retransmission with respect to the data unit continuously fails and thereby a number of retransmissions exceeds a predetermined maximum number of retransmissions, the corresponding data unit may be processed as a retransmission failure and thereby may no longer be retransmitted.

The data reception apparatus may be unaware of whether the retransmission with respect to the data unit fails and thus, may continuously wait to receive the corresponding data unit and repeat an operation of transferring the transmission failure message to a reception side. In the above continuously waiting state, when the data transmission apparatus continuously transmits additional data, a transmission window of the data transmission apparatus and a reception window of the data reception apparatus may become full. Accordingly, the data transmission apparatus and the data reception apparatus may fall into a deadlock state where it is impossible to transmit or receive the additional data.

In a conventional art, when the deadlock state occurs due to the retransmission failure, the RLC layer may need to transmit an error notice to the upper layer, and operate according to an instruction from the upper layer. Specifically, the upper layer may perform an operation of resetting or releasing a corresponding RLC entity in response to the error notice received from the RLC layer. However, resetting or releasing of the RLC layer as above may use a large amount of time, or may discard all the data currently being transmitted and received, which may result in deteriorating a service quality. Accordingly, there is a desire for a method that may more effectively process an RLC retransmission failure.

SUMMARY

An aspect of the present invention provides a method that enables a transmission entity and a reception entity to continuously transmit and receive additional data without falling into a deadlock state, when a retransmission failure is repeated in a Radio Link Control (RLC) layer.

According to an aspect of the present invention, there is provided a data transmission apparatus, including: a retransmission counting unit to count a number of retransmissions with respect to a transmission data unit; a comparison unit to compare the counted number of retransmissions with respect to the transmission data unit with a predetermined threshold; and a data unit discarding unit to discard the transmission data unit depending on the comparison result.

According to another aspect of the present invention, there is provided a data reception apparatus, including: a receiver to receive a transmission data unit from a data transmission apparatus; a reception window manager to manage a list of data units that are to be received by the data reception apparatus from the data transmission apparatus; and a comparison unit to compare a minimum value among sequence numbers of the data units included in the list with a sequence number of the transmission data unit. The reception window manager may update the minimum value and a data unit reception failure timer depending on the comparison result.

According to still another aspect of the present invention, there is provided a data transmission apparatus, including: a transmission window manager to manage a list of data units that are transmitted to a data reception apparatus, and of which a reception confirmation message is not received from the data reception apparatus; a receiver to receive a transmission failure message with respect to a transmission data unit among the data units included in the list; a transmitter to retransmit the transmission data unit to the data reception apparatus according to the transmission failure message; and a retransmission counting unit to count a number of retransmissions with respect to the transmission data unit. When the number of retransmissions is greater than a predetermined threshold, the transmission window manager may delete the transmission data unit from the list.

According to embodiments of the present invention, when a retransmission failure is repeated in an RLC layer, a transmission entity and a reception entity may continuously transmit and receive additional data without falling into a deadlock state.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 8 is a block diagram illustrating a structure of a data transmission apparatus according to another embodiment of the present invention.

DETAILED DESCRIPTION

Figure 1:
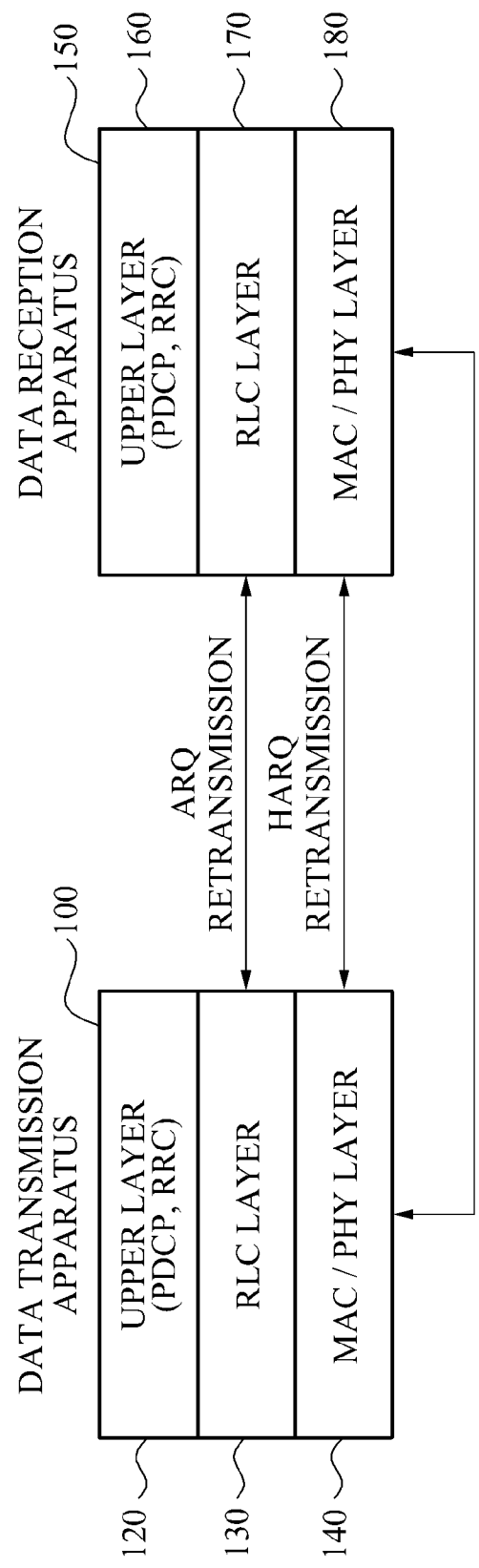
FIG. 1 is a diagram illustrating a structure of a radio interface protocol in a Long Term Evolution (LTE)-Advanced system according to a conventional art.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a structure of a radio interface protocol in a Long Term Evolution (LTE)-Advanced system according to a conventional art.

Referring to FIG. 1, a radio interface of the LTE-Advanced system may include Medium Access Control (MAC)/physical (PHY) layers 140 and 180, and Radio Link Control (RLC) layers 130 and 170. Each of upper layers 120 and 160 of the RLC layers 130 and 170 may include a Packet Data Convergence Protocol (PDCP) layer and a Radio Resource Control (RRC) layer. The RLC layers 130 and 170, and the MAC/PHY layers 140 and 180 may guarantee reliable transfer of data in the upper layers 120 and 160. For the reliable transfer of data, the RLC layers 130 and 170 may provide a retransmission function using an Automatic Repeat Request (ARQ) scheme, and the MAC/PHY layers 140 and 180 may provide a retransmission function using a Hybrid-ARQ (HARQ) scheme.

A data transmission apparatus 100 may include the upper layer 120, the RLC layer 130, and the MAC/PHY layer 140, and a data reception apparatus 150 may include the upper layer 160, the RLC layer 130, and the MAC/PHY layer 180. The above layers included in each of the data transmission apparatus 100 and the data reception apparatus 150 may provide a reliable data transmission service using a communication with the respective corresponding layers.

Generally, the RLC layers 130 and 170 may provide a transmission service to the upper layers 120 and 160 in three modes. A first mode corresponds to a transparent mode (TM). In the TM, the RLC layer 130 of the data transmission apparatus 100 may transfer, to the RLC 170 of the data reception apparatus 150, a data unit received from the upper layer 120 in a state where no manipulation is performed on the data unit. The data unit transmitted by the RLC layer 130 of the data transmission apparatus 100 may be a Service Data Unit (SDU).

A second mode corresponds to an unacknowledged mode (UM). In the UM, the RLC layer 130 of the data transmission apparatus 100 may divide or combine the data unit received from the upper layer 120, add an RLC header to the data unit, and thereby transfer the data unit to the RLC layer 170 of the data reception apparatus 150. The RCL layer 170 may remove the RCL header from the received data unit, assemble the received data unit, and transfer the assembled data unit to the upper layer 160. In the UM, the RLC layers 130 and 170 may not provide a retransmission function. However, due to a HARQ retransmission in the PHY/MAC layers 140 and 180, data units may be received in an arbitrary order. In this case, a reordering function may be provided to reorder the data units received in an arbitrary order.

A third mode corresponds to an acknowledged mode (AM). Compared to the UM, the AM may add an ARQ function and thereby guarantee a reliable transfer. For this, the RLC layer 170 of the data reception apparatus 150 may perform a function of reporting, to the RLC layer 130 of the data transmission apparatus 100, status information of data units that are received so far. The RLC layer 130 of the data transmission apparatus 100 may retransmit data units of which transmissions fail, based on status information received from the RLC layer 170 of the data reception apparatus 150.

Figure 2:
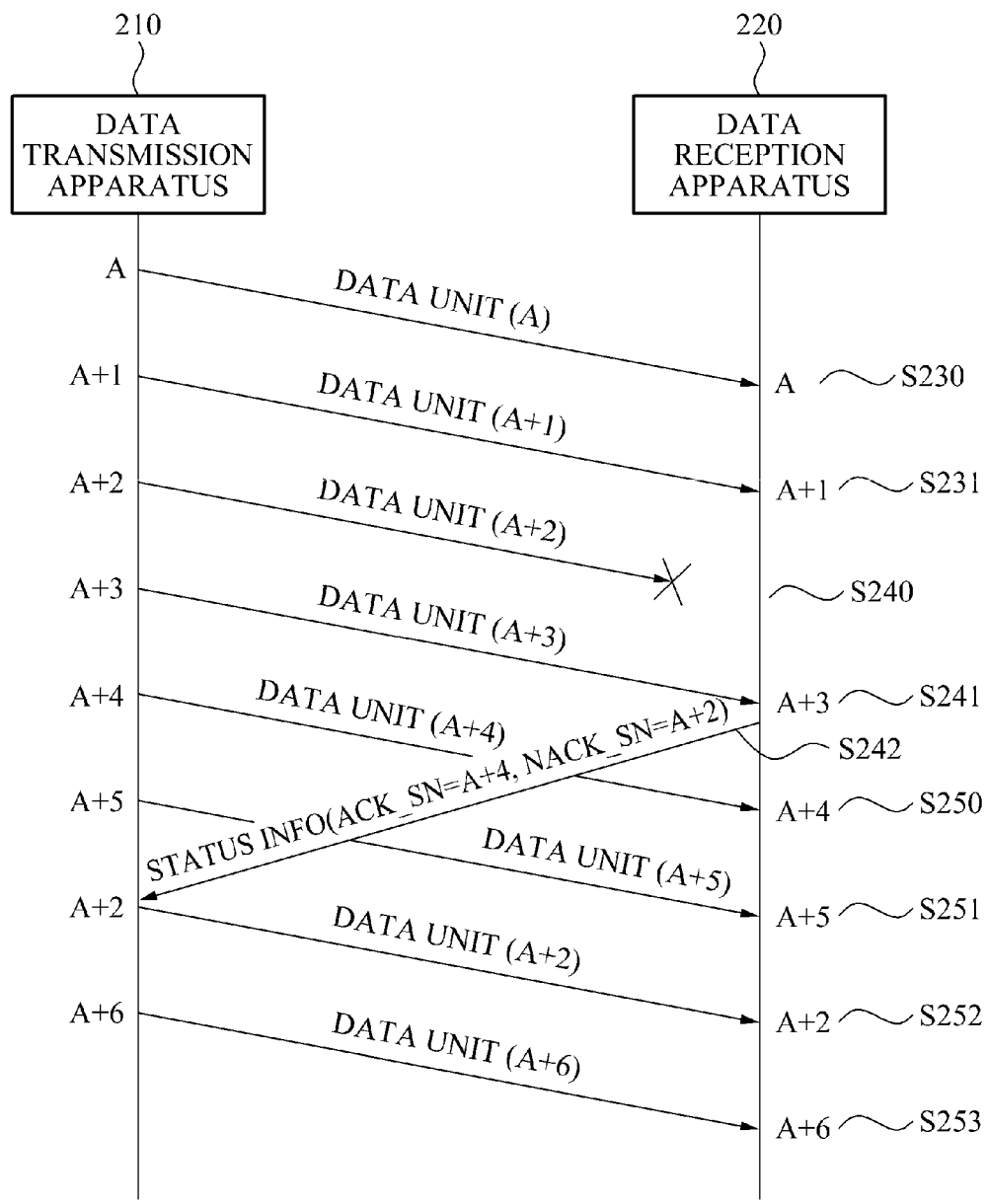
FIG. 2 is a diagram illustrating a data transmission between Radio Link Control (RLC) entities according to an embodiment of the present invention.

FIG. 2 is a diagram illustrating a data transmission between RLC entities according to an embodiment of the present invention.

An RLC entity of a data transmission apparatus 210 may configure a data unit and transmit the data unit in a corresponding order. An RLC entity of a data reception apparatus 220 may transfer a status message to the data transmission apparatus 210 and thereby inform the data transmission apparatus 210 about status information associated with data units received so far. The status message may be generated when a transmission request is detected from the data transmission apparatus 210 while polling, or when a packet loss in the data reception apparatus 220 is detected.

In operation S230, the data transmission apparatus 210 may transmit, to the data reception apparatus 220, a data unit having a sequence number A. Here, it is assumed that a transmission of the data unit having the sequence number A is a success.

In operation S231, the data transmission apparatus 210 may transmit, to the data reception apparatus 220, a data unit having a sequence number (A+1). Here, it is assumed that a transmission of the data unit having the sequence number (A+1) is also a success.

In operation S240, the data transmission apparatus 210 may transmit, to the data reception apparatus 220, a data unit having a sequence number (A+2). Here, it is assumed that a transmission of the data unit having the sequence number (A+2) is a failure. When the data reception apparatus 220 does not receive the data unit having the sequence number (A+2), the data reception apparatus 220 may not determine whether a reception of the data unit having the sequence number (A+2) is a success.

In operation S241, the data transmission apparatus 210 may transmit, to the data reception apparatus 220, a data unit having a sequence number (A+3). Here, it is assumed that a transmission of the data unit having the sequence number (A+3) is also a success. When the sequence number of the data unit received by the data reception apparatus 220 is discontinuous, the data reception apparatus 220 may determine that the transmission of the data unit having the sequence number (A+2) is a failure.

In operation S242, the data reception apparatus 220 may transmit, to the data transmission apparatus 210, a transmission failure message with respect to the data unit having the sequence number (A+2). The transmission failure message may include a single ACK_SN field and at least zero NACK_SN field. ACK_SN may be set to have a value of 1 greater than a maximum sequence number among received sequence numbers. Specifically, ACK_SN denotes a sequence number of an additional data unit that is to be subsequently received. A sequence number of a data unit that is not received and thus is determined to be retransmitted may be input into the NACK_SN field. When the NACK_SN field does not exist, it may indicate that all the data units until ACK_SN−1 are completely received.

In operations S250 and S251, the data transmission apparatus 210 may transmit, to the data reception apparatus 220, a data unit having a sequence number (A+4) and a data unit having a sequence number (A+5). Here, it is assumed that transmissions of the data units having the sequence numbers (A+4) and (A+5) succeed.

In operation S252, the data transmission apparatus 210 receiving the transmission failure message with respect to the data unit having the sequence number (A+2) may retransmit the data unit having the sequence number (A+2). In this instance, the data transmission apparatus 210 may update a number of retransmissions with respect to the data unit having the sequence number (A+2).

In operation S253, the data transmission apparatus 210 may transmit, to the data reception apparatus 220, a data unit having a sequence number (A+6).

When the data reception apparatus 220 receives the data unit having the sequence number (A+5) and subsequently receives the data unit having the sequence number (A+2), the RLC entity of the data reception apparatus 220 may reorder the data units having the sequence numbers (A+2) through (A+5), and thereby configure an RLC SDU and transfer the RLC SDU to an upper layer. Depending on a data unit transmission result, the RLC entity of the data transmission apparatus 210 may report to the upper layer about a transmission result, for example, a success or a failure with respect to each RLC SDU included in a corresponding data unit. The above function may be provided only when a request is received from the upper layer. Specifically, when the upper layer requests the RLC entity for a data transmission with respect to a particular RLC SDU using an RLC_AM_DATA_REQ primitive, and sets a Confirmation Required field to "TRUE", the RLC entity of the data transmission apparatus 210 may report to the corresponding upper layer about a result, for example, a success or a failure with respect to a transmission of a data unit including the SDU, using an RLC_AM_DATA_CNF primitive.

Figure 3:
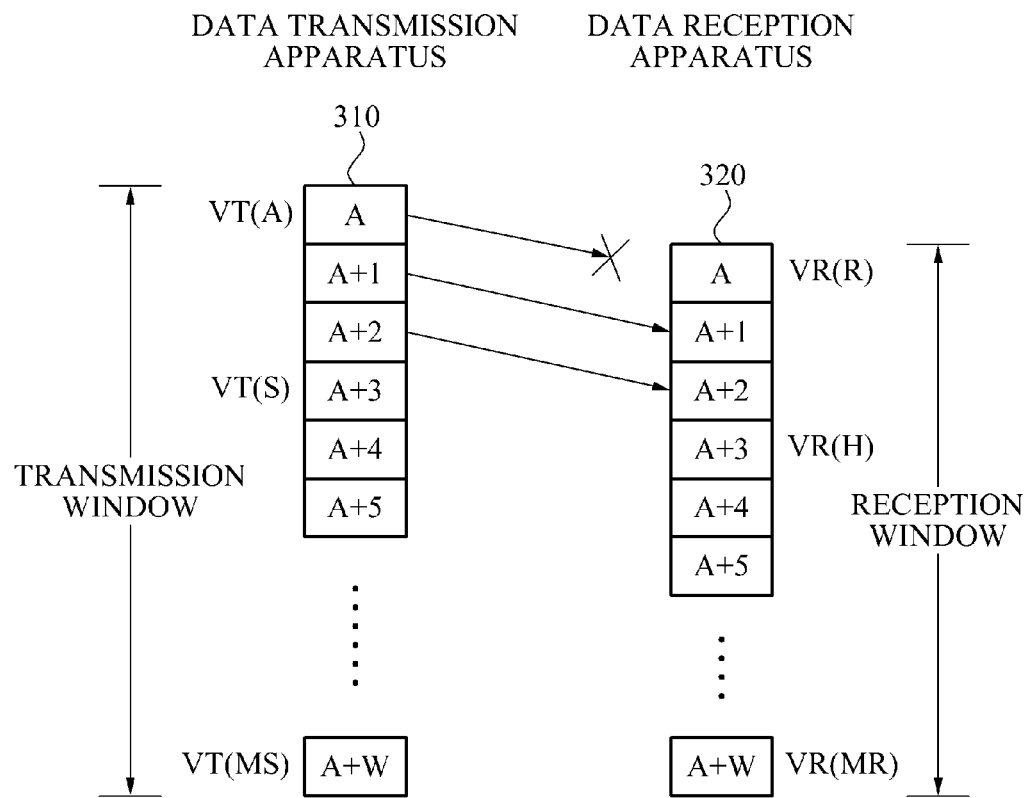
FIG. 3 is a diagram illustrating a concept of transmission and reception window status variables between RLC entities according to an embodiment of the present invention.

FIG. 3 is a diagram illustrating a concept of transmission and reception window status variables between RLC entities according to an embodiment of the present invention.

Transmission window status variables used by an RLC entity of a data transmission apparatus 310 may include VT(A), VT(S), and VT(MS). VT(A) denotes a minimum sequence number waiting for an acknowledgement (ACK) from an RLC entity of a data reception apparatus 320. When the RLC entity of the data transmission apparatus receives, from the RLC entity of the data reception apparatus 320, an ACK with respect to VT(A) as a status message, the RLC entity of the data transmission apparatus 310 may update a value of VT(A) to a sequence number of a data unit having not yet received the ACK.

VT(S) denotes a sequence number of an additional data unit to be subsequently transmitted. Every time the data transmission apparatus 310 transmits the additional data unit, a value of VT(S) may increase by one. VT(MS) denotes a limit of a transmission window, and may have a relationship of VT(MS)=VT(A)+AM_WINDOW_SIZE. AM_WINDOW_SIZE denotes a size of a transmission window. An interval from VT(A) to VT(MS) is referred to as the transmission window. The RLC entity of the data transmission apparatus 310 may transmit packets from VT(A) to VT(S)−1, and may need to receive ACK/NACK information associated with the transmitted packets from the data reception apparatus 320 using a status message. When a transmission of an additional data unit continues in a state where ACK/NACK information with respect to VT(A) is not received from the data reception apparatus 320, VT(S)=VT(MS). Accordingly, the data transmission apparatus 310 may no longer transmit the additional data unit.

Reception window status variables used by an RLC entity of the data reception apparatus 320 may include VR(R), VR(H), and VR(MR). VR(R) denotes a smallest sequence number that is to be received by the data reception apparatus 320. When a data unit with the sequence number VR(R) is received, VR(R) may be updated with a smallest sequence number to be subsequently received.

VR(H) denotes a subsequent sequence number of a largest sequence number among sequence numbers of data units received so far. Therefore, when the RLC entity of the data reception apparatus 320 receives a data unit having a sequence number SN>=VR(H), VR(H) may be updated with SN+1.

VR(MR) denotes a limit of a reception window, and may have a relationship of VR(MR)=VR(R)+AM_WINDOW_SIZE. An interval from VR(R) to VR(MR) is referred to as a reception window. When additional data units are continuously received in a state where a reception of a data unit having the sequence number VR(R) fails, the reception window may become larger and larger. When VR(H)=VR(MR), it may be impossible to receive an additional data unit. Specifically, when a retransmission of the data transmission apparatus 310 with respect to the data unit having the sequence number VT(A) fails, the data reception apparatus 320 may continuously transmit, to the data transmission apparatus 310, a NACK with respect to a data unit corresponding to the sequence number VT(A), that is, a data unit having the sequence number VR(R). However, since the data transmission apparatus 310 already fails in transmitting the corresponding data unit, a retransmission of the corresponding data unit may no longer be considered.

When the RLC entity of the data transmission apparatus 310 continuously transmits an additional data unit to the data reception apparatus 320 in the above state, the data transmission apparatus 310 may be in a state where VT(S)=VT(MS), and the data reception apparatus 320 may be in a state where VR(H)=VR(MR). Accordingly, the data transmission apparatus 310 and the data reception apparatus 320 may fall into a deadlock state where additional data may not be transmitted and received.

Figure 4:
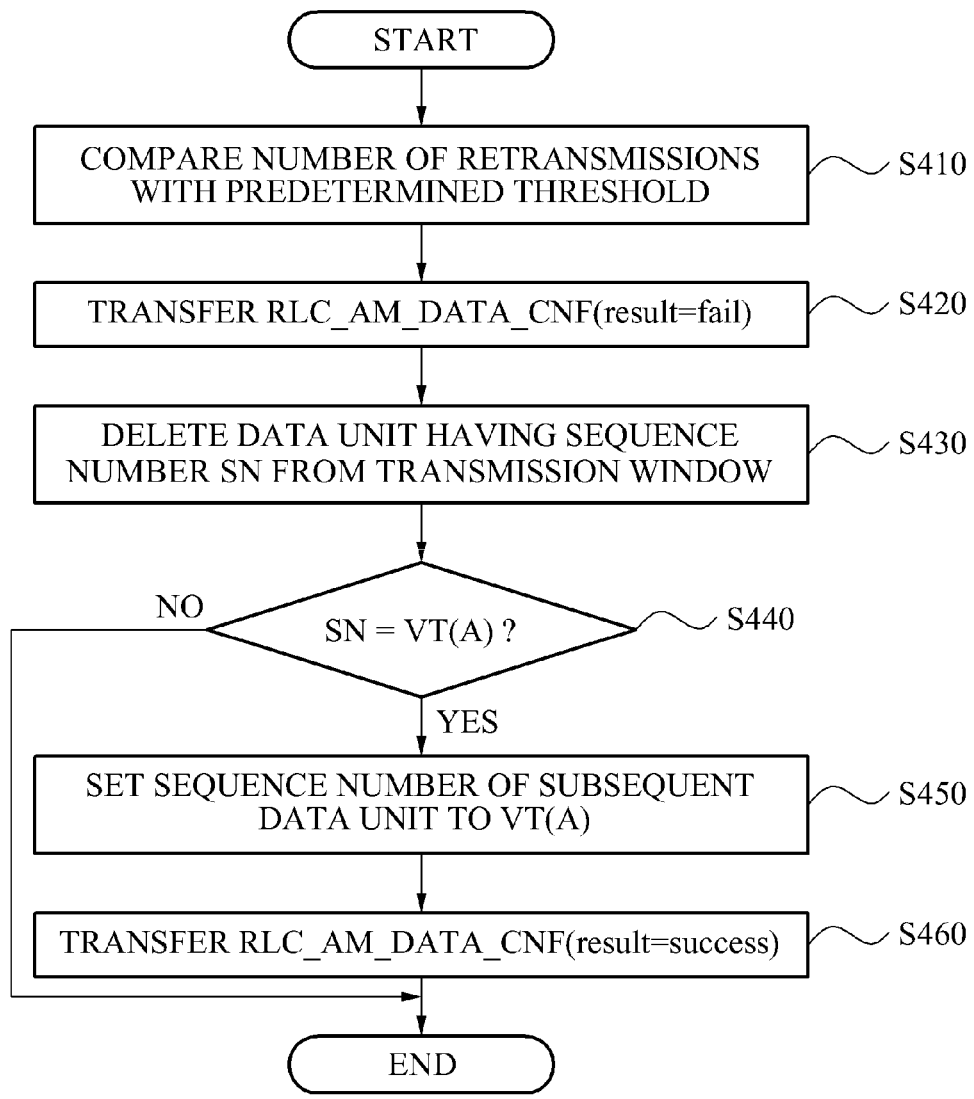
FIG. 4 is a flowchart illustrating a method of processing a retransmission failure in an RLC entity of a data transmission apparatus according to an embodiment of the present invention.

FIG. 4 is a flowchart illustrating a method of processing a retransmission failure in an RLC entity of a data transmission apparatus according to an embodiment of the present invention.

In operation S410, the RLC entity of the data transmission apparatus may compare a predetermined threshold with a number of retransmissions with respect to a data unit having a sequence number SN. Here, a case where the number of retransmissions with respect to the data unit is greater than the predetermined threshold may be assumed.

When an upper layer requests a transmission result report with respect to each RLC SDU included in a corresponding data unit, the RLC entity of the data transmission apparatus may transfer, to the upper layer, an RLC_AM_DATA_CNF (result=fail) primitive in operation S420.

In operation S430, the RLC entity of the data transmission apparatus may delete, from a transmission window, the corresponding data unit of which a retransmission fails.

In operation S440, the RLC entity of the data transmission apparatus may compare the sequence number SN of the corresponding data unit with a status variable VT(A).

When the sequence number of the corresponding data unit is the same as the status variable VT(A), the RLC entity of the data transmission apparatus may update VT(A) with a sequence number value of a subsequent data unit having not yet received an ACK in operation S450.

In operation S460, the RLC entity of the data transmission apparatus may set transmissions of data units having sequence numbers greater than VT(A) before updating and less than VT(A) after updating as a transmission complete. When an upper layer requests a transmission result report with respect to each of RLC SDUs constituting the corresponding data unit, the RLC entity of the data transmission apparatus may generate an RLC_AM_DATA_CNF (result=success) primitive, and transfer the generated RLC_AM_DATA_CNF(result=success) primitive to the upper layer.

Through the above process, even though a retransmission of VT(A) fails, the RLC entity of the data transmission apparatus may locally discard TV(A) and move the transmission window and thereby may continuously transfer additional data without falling in a state where transmission is impossible.

Figure 5:
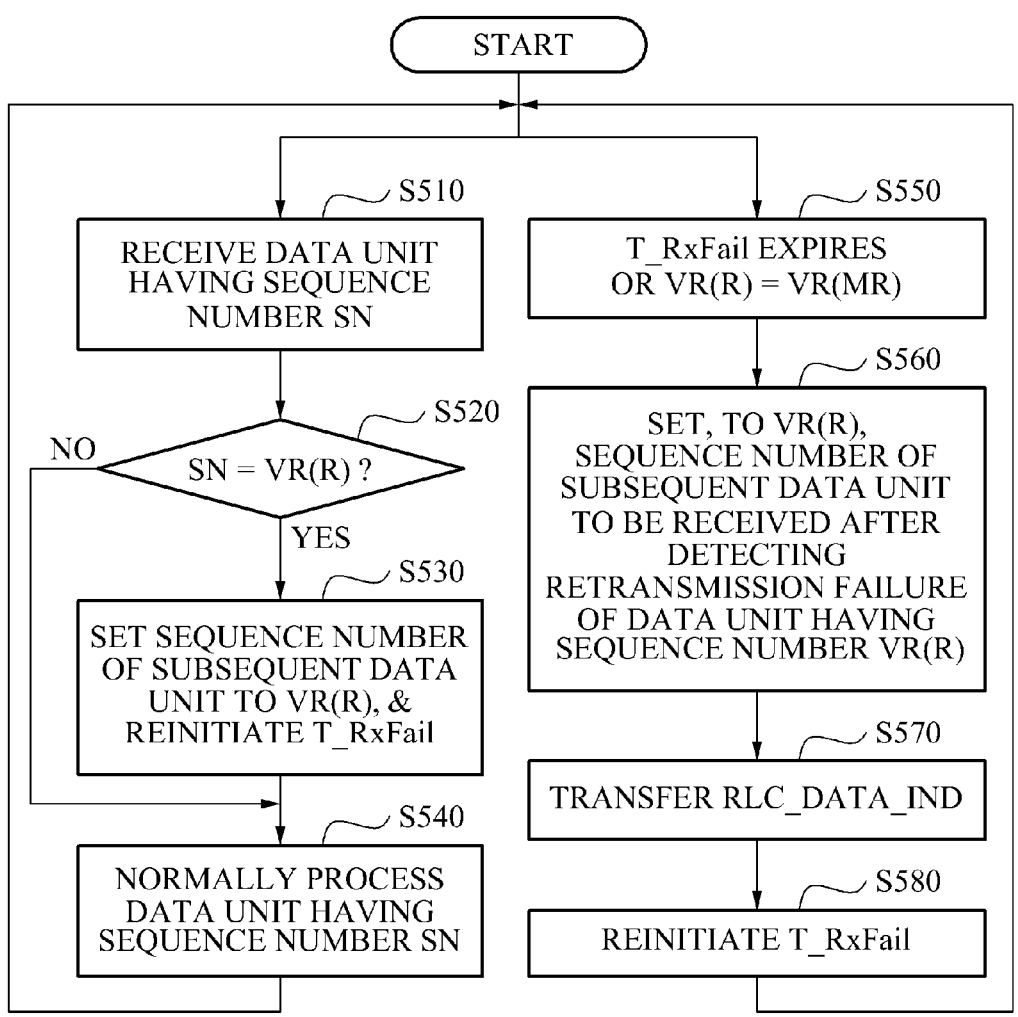
FIG. 5 is a flowchart illustrating a method of processing a reception failure in an RLC entity of a data reception apparatus according to an embodiment of the present invention.

FIG. 5 is a flowchart illustrating a method of processing a reception failure in an RLC entity of a data reception apparatus according to an embodiment of the present invention.

In operation S510, the RLC entity of the data reception apparatus may receive a data unit having a sequence number SN.

In operation S520, the RLC entity of the data reception apparatus may compare the sequence number SN with VR(R).

When SN=VR(R), the RLC entity of the data reception apparatus may update VR(R) with a sequence number value of a subsequent data unit that is to be received in operation S530. Also, the RLC entity of the data reception apparatus may restart a data unit reception failure timer T_RxFail in operation S530.

In operation S540, the RLC entity of the data reception apparatus may apply a general reception processing procedure with respect to the data unit having the sequence number SN.

Conversely, when SN is different from VR(R) in operation S520, the RLC entity of the data reception apparatus may apply a general data unit reception processing procedure with respect to the received data unit in operation S540.

When the data unit reception failure timer T_RxFail expires or a state where a reception window is full occurs, that is, VR(H)=VR(MR) occurs in operation S550, the RLC entity of the data reception apparatus may determine a retransmission of the data unit having the sequence number VR(R) as a failure. Also, the RLC entity of the data reception apparatus may update VR(R) with a sequence number value of a subsequent data unit that is to be received.

In operation S570, the RLC entity of the data reception apparatus may assemble an RLC SDU from a data unit having a sequence number greater than VR(R) before updating and less than VR(R) after updating. The RLC entity of the data reception apparatus may transfer the assembled RLC SDU to the upper layer using an RLC_AM_DATA_IND primitive.

In operation S580, the RLC entity of the data reception apparatus may restar a data unit reception failure timer T_RxFail. Through the above process, even though a reception of a particular data unit fails, the reception window may not be full and the RLC entity of the data reception apparatus may continuously receive an additional data unit.

As described above, a retransmission reception failure in the data reception apparatus may be locally processed based on the data unit reception failure timer T_RxFail. Accordingly, by setting a value of the data unit reception failure timer T_RxFail to be a sufficiently great value based on a maximum number of ARQ retransmissions, only a data unit of which a retransmission fails may be discarded from the reception window. When a maximum number of retransmissions is set to N, a maximum number of (N+1) data unit transmissions may be performed in the data transmission apparatus.

In general, even though a packet loss is detected, the data reception apparatus may determine whether to transfer a NACK after a predetermined period of time corresponding to an amount of time used for reordering is elapsed, instead of immediately transferring a NACK to the data transmission apparatus. Specifically, even though the packet loss is detected, a recovery by an HARQ retransmission may be performed in a lower layer. Therefore, there is a spare time corresponding to a particular amount of time, for example, an amount of time used for reordering. Based on this, when an amount of time used for an HAQR retransmission is tHARQ, a maximum number of HARQ retransmissions is nHARQ, and a number of ARQ retransmissions is nAQR, the RLC entity of the data reception apparatus may set tReordering to be greater than tHARQ×(nHARQ+1), and may set T_RxFail to be greater than tReordering×nARQ. Specifically, the RLC entity of the data reception apparatus may set tRxFail to be greater than tHARQ×(nHARQ+1)×(nARQ+1).

Figure 6:
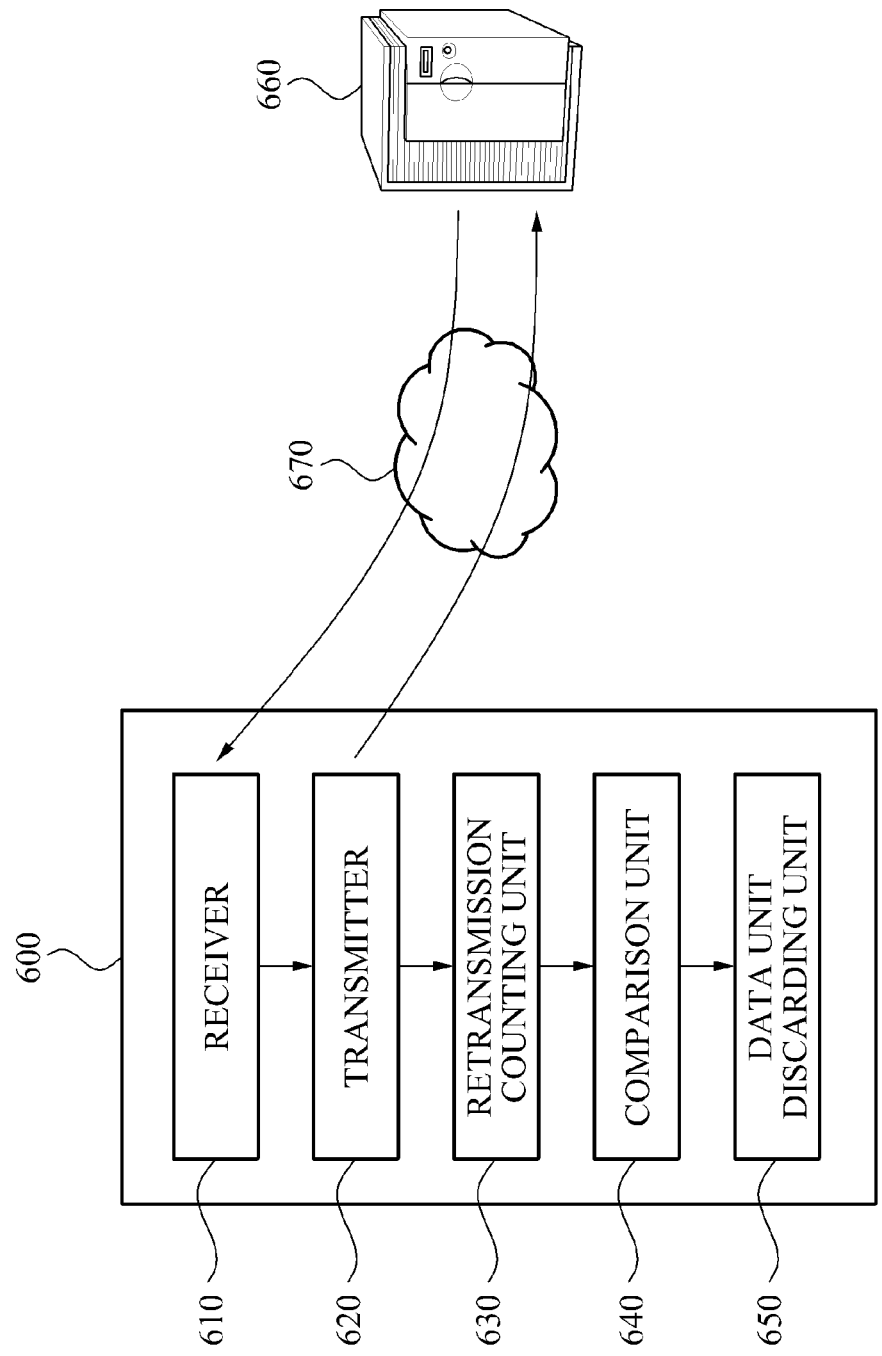
FIG. 6 is a block diagram illustrating a structure of a data transmission apparatus according to an embodiment of the present invention.

FIG. 6 is a block diagram illustrating a structure of a data transmission apparatus 600 according to an embodiment of the present invention.

A transmitter 620 may transmit a transmission data unit to a data reception apparatus 660 over a network 670. While the transmission data unit is being transmitted over the network 670, the transmission data unit may not be transmitted to the data reception apparatus 660 due to various reasons. This may correspond to a case where a transmission of a transmission data unit fails.

When the transmission of the transmission data unit fails, a receiver 610 may receive a transmission failure message, that is, a NACK with respect to the transmission data unit.

When the receiver 610 receives the transmission failure message with respect to the transmission data unit, a retransmission counting unit 630 may update a number of retransmissions with respect to the transmission data unit.

A comparison unit 640 may compare the number of retransmissions with respect to the transmission data unit with the predetermined threshold. When the number of retransmissions with respect to the transmission data unit is greater than the predetermined threshold, the comparison unit 640 may transmit, to an upper layer, a transmission failure confirmation message with respect to the transmission data unit.

A data unit discarding unit 650 may discard the transmission data unit depending on the comparison result. The discarded transmission data unit may be deleted from the transmission window. As the transmission data unit is deleted, a start location of the transmission window may be changed. Even though the location of the transmission window is changed, the data transmission apparatus 600 may not fall into a state where transmission is impossible, and may continuously transfer additional data.

Data units included in the transmission window correspond to data units waiting for receiving a reception confirmation message from the data reception apparatus 660.

According to an embodiment of the present invention, when a minimum value among sequence numbers of the data units included in the transmission window is the same as a sequence number of the transmission data unit, the data unit discarding unit 650 may increase the minimum value to a second smallest value among the sequence numbers of the data units included in the transmission window.

In this case, the data unit discarding unit 650 may set transmissions of data units having sequence numbers between a minimum value before being updated and an updated minimum value, that is, the second smallest value, among the data units included in the transmission window, as a transmission complete.

Also, the data unit discarding unit 650 may transmit, to the upper layer, a transmission success confirmation message with respect to the data units having the sequence numbers between the minimum value before updating and the updated minimum value, that is, the second smallest value, among the data units included in the transmission window.

Figure 7:
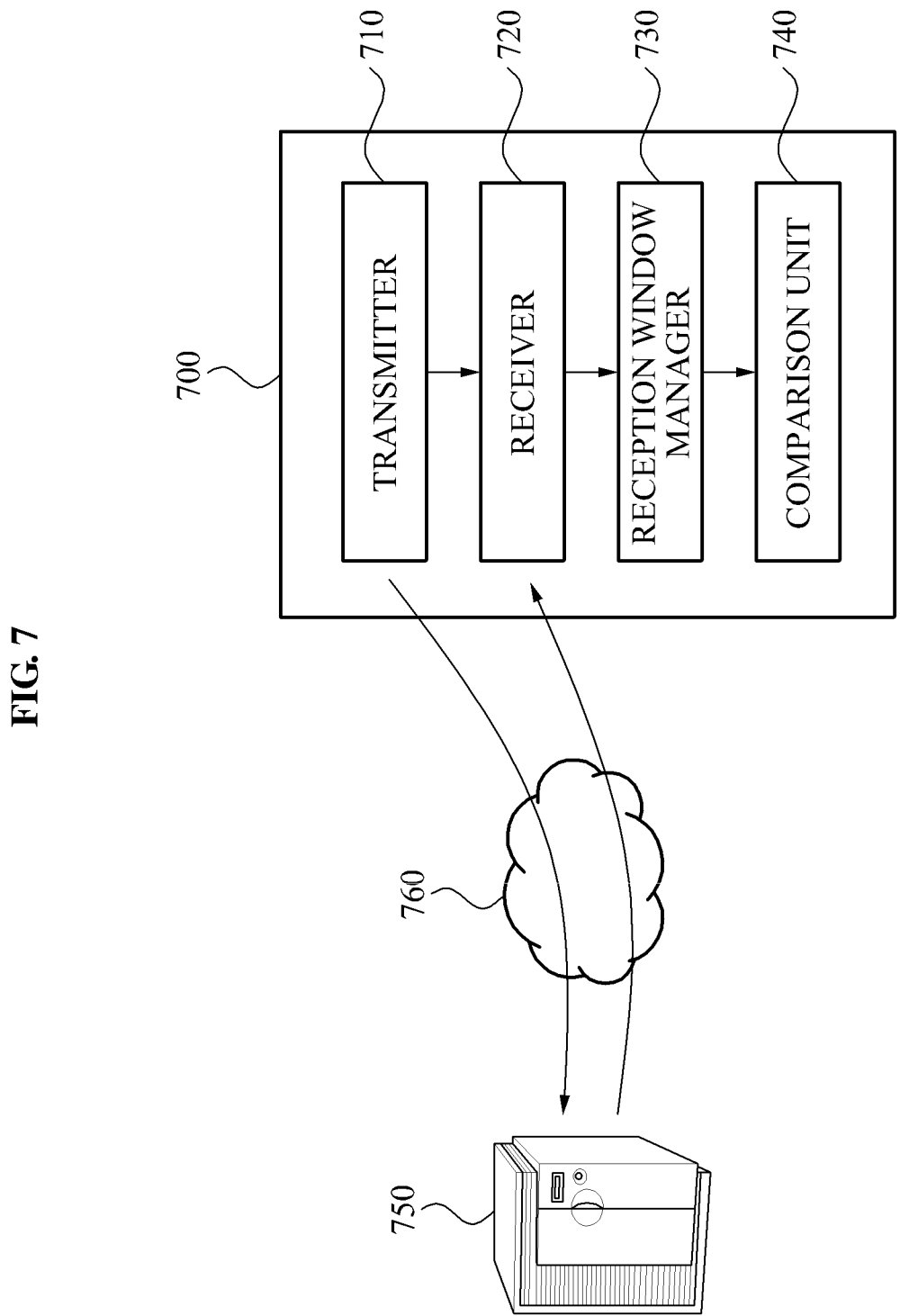
FIG. 7 is a block diagram illustrating a structure of a data reception apparatus according to an embodiment of the present invention.

FIG. 7 is a block diagram illustrating a structure of a data reception apparatus 700 according to an embodiment of the present invention.

A receiver 720 may receive a transmission data unit from a data transmission apparatus 750 over a network 760. While the transmission data unit is being transmitted over the network 760, the transmission data unit may not be transmitted to the data reception apparatus 700 due to some reasons. This may correspond to a case where a transmission of a transmission data unit fails.

When the transmission of the transmission data unit fails, a transmitter 710 may transmit, to the data transmission apparatus 750, a transmission failure message with respect to the transmission data unit over the network 760. In response to the transmission failure message, the data transmission apparatus 750 may retransmits the transmission data unit to the receiver 720. The receiver 720 may receive again the transmission data unit according to an HARQ retransmission scheme.

A reception window manager 730 may manage a list of data units that is to be received by the data reception apparatus 700 from the data transmission apparatus 750.

A comparison unit 740 may compare a minimum value among sequence numbers of data units included in the list with a sequence number of the transmission data unit received by the receiver 720.

When the sequence number of the transmission data unit is greater than the minimum value among the sequence numbers of the data units included in the list, the comparison unit 740 may determine a reception with respect to a data unit corresponding to the minimum value as a failure.

The reception window manager 730 may update the minimum value among the sequence numbers of the data units included in the list, depending on the comparison result of the comparison unit 740. When the minimum value is the same as the sequence number of the transmission data unit, the reception window manager 730 may update the minimum value by deleting, from the list, the data unit corresponding to the minimum value.

Also, when a reception with respect to the data unit corresponding to the minimum value is determined as a failure, the reception window manager 730 may update the minimum value by deleting, from the list, the data unit corresponding to the minimum value.

The minimum value may be updated with the second smallest value among the sequence numbers of the data units included in the list. In this case, the comparison unit 740 may determine a transmission of the transmission data unit as a success and the reception window manager 730 may restart a data unit reception failure timer.

The reception window manager 730 may transmit, to the upper layer, a transmission success message with respect to data units having sequence numbers between the minimum value before updating and the updated minimum value. In this case, the comparison unit 730 may determine a transmission of the transmission data unit succeeds and the reception window manager 730 may restart the data unit reception failure timer.

The reception window manager 730 may transmit, to an upper layer, a transmission success message with respect to data units having sequence numbers between the minimum value before being updated and the updated minimum value. In this case, the reception window manager 730 may restart the data unit reception failure timer.

The comparison unit 740 may determine whether the reception of the transmission data unit is a success based on the data unit reception failure timer. Specifically, when the data unit reception failure timer is expired, the comparison unit 740 may determine the reception with respect to the data unit corresponding to the minimum value as a failure.

The reception window manager 730 may reorder data units included in the list according to the sequence number of the transmission data unit. A predetermined amount of time may be used for reordering of the reception window manager 730. Even though a packet loss is detected, a recovery by an HARQ retransmission may be performed in a lower layer. Therefore, the data reception apparatus 700 may determine whether to transfer a NACK after an amount of timed used for reordering is elapsed.

Specifically, a value of the data unit reception failure timer may be determined to be greater than the amount of time used for reordering.

Based on this, when an amount of time used for an HAQR retransmission is tHARQ, a maximum number of HARQ retransmissions is nHARQ, and a number of ARQ retransmissions is nAQR, the data reception apparatus 700 may set tReordering to be greater than tHARQ×(nHARQ+1), and may set T_RxFail to be greater than tReordering×nARQ, specifically, tRxFail>tHARQ×(nHARQ+1)×(nARQ+1).

FIG. 8 is a block diagram illustrating a structure of a data transmission apparatus 800 according to another embodiment of the present invention.

A transmitter 820 may transmit a transmission data unit to a data reception apparatus 850 over a network 860. When a transmission of the transmission data unit fails, a receiver 810 may receive a transmission failure message with respect to the transmission data unit.

The transmitter 820 may retransmit the transmission data unit to the data reception apparatus 850 according to the transmission failure message. When a transmission of the transmission data unit succeeds, the receiver 810 may receive, from the data reception apparatus 850, a reception confirmation message with respect to the transmission data unit.

A transmission window manager 840 may manage a list of data units that are transmitted to the data reception apparatus 850, however, of which reception confirmation messages are not received from the data reception apparatus 850.

The transmission window manager 840 may delete, from the list, the data units of which reception confirmation messages are received by the receiver 810.

A retransmission counting unit 830 may count a number of retransmissions with respect to the transmission data unit. When the counted number of retransmissions is greater than a predetermined threshold, the transmission window manager 840 may delete the transmission data unit from the list. In this case, the transmission window manager 840 may transmit, to the upper layer, a transmission failure confirmation message with respect to the deleted transmission data unit.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A data reception apparatus, comprising:
    a receiver to receive a transmission data unit from a data transmission apparatus;
    a reception window manager to manage a list of data units that are to be received by the data reception apparatus from the data transmission apparatus; and
    a comparison unit to compare a minimum value among sequence numbers of the data units included in the list with a sequence number of the transmission data unit,
    wherein the reception window manager updates the minimum value and a data unit reception failure timer depending on the comparison result,
    wherein when the sequence number of the transmission data unit is greater than the minimum value among the sequence numbers of the data units included in the list, the comparison unit determines a reception of the data unit corresponding to the minimum value as a failure.

2. The data reception apparatus of claim 1, wherein when the minimum value is the same as the sequence number of the transmission data unit, the reception window manager updates the minimum value by deleting a data unit corresponding to the minimum value from the list, and restarts the data unit reception failure timer.

3. The data reception apparatus of claim 2, wherein when the data unit reception failure timer is expired, the comparison unit determines a reception with respect to the data unit corresponding to the minimum value as a failure.

4. The data reception apparatus of claim 3, wherein:
    the reception window manager reorders the data units included in the list according to the sequence number of the transmission data unit, and
    a value of the data unit reception failure timer is greater than an amount of time used for reordering.

5. The data reception apparatus of claim 4, further comprising:
    a receiver to perform Hybrid-Automatic Repeat Request (HARQ) re-reception with respect to the transmission data unit depending on the comparison result,
    wherein the amount of time used for reordering is greater than a product of an amount of time used for the HARQ retransmission and a maximum number of HARQ retransmissions.

6. The data reception apparatus of claim 3, further comprising:
    a receiver to perform HARQ re-reception with respect to the transmission data unit depending on the comparison result,
    wherein a value of the data unit reception failure timer is determined according to the following Equation 1:

$$tRxFail > tHARQ \times (nHARQ+1) \times (nARQ+1), \quad \text{[Equation 1]}$$

where tRxFail denotes the data unit reception failure timer, tHARQ denotes an amount of time used for the HARQ retransmission, nHARQ denotes a maximum number of HARQ retransmissions, and nARQ denotes a maximum number of ARQ retransmissions.

7. The data reception apparatus of claim 1, wherein when the sequence number of the transmission data unit is greater than the minimum value among the sequence numbers of the data units included in the list, the comparison unit determines a reception with respect to a data unit corresponding to the minimum value as a failure.

8. The data reception apparatus of claim 7, wherein when the reception with respect to the data unit corresponding to the minimum value is determined as the failure, the reception window manager updates the minimum value by deleting the data unit corresponding to the minimum value from the list.

9. The data reception apparatus of claim 8, wherein the reception window manager transmits, to an upper layer, a transmission success message with respect to data units having sequence numbers between the minimum value and the updated minimum value.

10. The data reception apparatus of claim 9, wherein the reception window manager restarts the data unit reception failure timer.

* * * * *